United States Patent
Agolini et al.

[15] 3,668,057
[45] June 6, 1972

[54] LAMINAR STRUCTURES OF METAL AND CRYSTALLINE COPOLYKETONES AND METHOD OF FORMING SAME

[72] Inventors: Franco Agolini; Rudolph John Angelo, both of Wilmington, Del.

[73] Assignee: E. I. du Pont de Nemours and Company, Wilmington, Del.

[22] Filed: June 10, 1970

[21] Appl. No.: 45,235

[52] U.S. Cl..................................161/165, 156/3, 156/244, 260/61, 260/63, 264/171
[51] Int. Cl..........................................................B32b 15/08
[58] Field of Search...................260/49, 61, 631 C; 161/165, 161/215; 156/82, 244, 3; 264/171

[56] References Cited

UNITED STATES PATENTS

| | | | |
|---|---|---|---|
| 3,075,868 | 1/1963 | Long | 156/82 |
| 3,441,538 | 4/1969 | Marks | 260/49 |
| 3,065,205 | 11/1962 | Bonner, Jr. | 260/63 K |
| 3,385,825 | 5/1968 | Goodman et al. | 260/61 |
| 3,013,913 | 12/1961 | Croop et al. | 161/165 X |
| 3,177,103 | 4/1965 | Tally et al. | 156/3 |
| 3,113,896 | 12/1963 | Mann | 156/3 |

*Primary Examiner*—Philip Dier
*Attorney*—Claude L. Beaudoin

[57] ABSTRACT

A laminar structure is provided which is characterized by at least one layer of a metal bonded to at least one layer of a crystalline copolyketone having the following recurring structural unit:

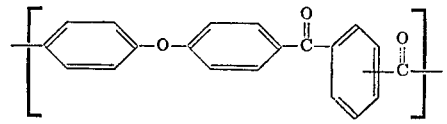

wherein the

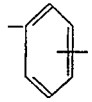

moiety is either

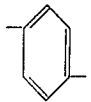

(T moiety) or

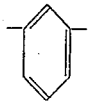

(I moiety), and the T:I ratio varies from 90:10 to 50:50; said laminar structure being useful for printed circuit applications.

16 Claims, No Drawings

LAMINAR STRUCTURES OF METAL AND CRYSTALLINE COPOLYKETONES AND METHOD OF FORMING SAME

THE INVENTION

The present invention relates to articles of manufacture of laminar construction and to a method of manufacture thereof. More particularly, the present invention is directed to a novel laminar structure of a metal and a crystalline copolyketone polymeric material which is useful for printed circuit applications.

The laminar articles of the present invention characterized by a layer of metal bonded to a crystalline copolyketone polymeric material are novel articles of manufacture desirable for many diverse uses because such structures are characterized by combinations of unique properties which are not possessed separately by each constituent or component thereof.

According to the present invention, there is provided a laminar structure comprising at least one layer of metal bonded to at least one layer of a crystalline copolyketone having the following repeating structural unit:

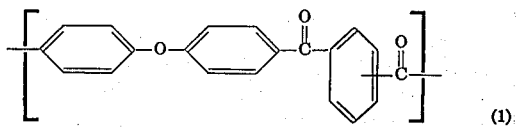

(1)

wherein the

moiety is either

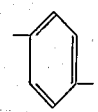

(T) or

(I) and the T:I ratio varies from 90:10 to 50:50. One embodiment of the present invention is that wherein a single metal foil is bonded to a single layer of the above described copolyketone. This type of structure is useful for printed circuits wherein portions of the metal are selectively removed in known manner with the aid of a resist and an etching bath. Other electrical elements such as resistors, transistors, capacitors, etc., may be combined as desired with the remaining wiring pattern to provide an electrical component incorporating the printed wiring pattern. Another embodiment of the present invention is that wherein two layers of metal are provided on opposite sides of a single layer of the above-described copolyketone film. By etching different patterns in the two metal foils and piercing the structure and providing side-to-side electrical connections through the copolyketone polymer sheet, electrical circuits of a more complex nature can be constructed. Yet another embodiment of the present invention is flexible flat cable, i.e., multi-conductor flat cable generally terminated with connections at each end similar to conventional wiring, consisting of two layers of the above-described copolyketone film having interposed therebetween a multiplicity of flat or round single or stranded wires.

Still another embodiment of the laminar structure of the present invention is resistance foils or heating units - such units consisting of resistance heating elements sandwiched between two layers of the above-described copolyketone film. The resistance heating element can be either a resistance wire or an etched resistance metal foil (copper, aluminum or steel).

According to the present invention, there is further provided a method of manufacture for preparing laminar structures which comprises contacting at least one surface of a layer of metal with a film structure of a copolyketone having the following repeating structural unit:

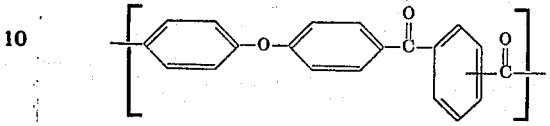

wherein the

moiety is either

(T moiety) or

(I moiety), and the T:I ratio varies from 90:10 to 50:50, at a temperature between about 300°C. and about 400°C. and a pressure of at least about 40 psi thereby to firmly bond together said metal and said copolyketone film. In a preferred embodiment, the method comprises melt-extruding a copolyketone film structure of the following repeating structural unit:

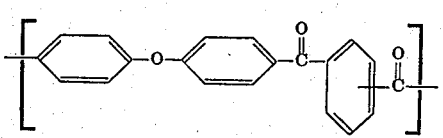

wherein the

moiety is either

(T) or

(I) and the T:I ratio varies from 90:10 to 50:50, at a temperature between about 300°C. and about 400°C., onto a metal sheet followed by advancing said composite structure through a pressure nip adapted to press said copolyketone film to said metal sheet at a pressure between about 40 psi and about 50 psi.

The laminar structure of the invention is characterized by at least one layer of a metal such as, for example, copper, aluminum, steel, etc. There are no limitations as regards the thickness of the metal except that it should be self-supporting. Ordinarily, the thickness of the metal layer will be between about 0.5 mil and about 20 mils. Material within this thickness range is customarily called a metal foil.

The laminar structure of the invention is further characterized by a layer of a copolyketone of the following recurring structural unit:

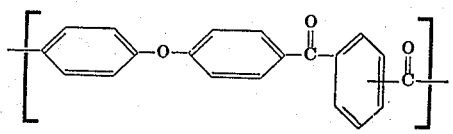

wherein the

moiety is either

(T) or

(I) and the T:I ratio varies from 90:10 to 50:50. The thickness of the copolyketone layer is between about 0.5 mil and about 20 mils.

The copolyketone film structure of the present invention is derived, usually be melt-extrusion, from a copolyketone composition obtained by Friedel-Crafts syntheses such as described in U.S. Pat. Nos. 3,065,205; U.S. Pat. No. 3,441,538 and U.S. Pat. No. 3,442,857 or various modifications of such syntheses. It is a necessary and essential requirement that the above copolyketone utilized in the present invention have an inherent viscosity of at least 0.75, and preferably 1.0, as measured on a 0.5 per cent by weight solution in concentrated sulfuric acid at 23°C. Laminar structures prepared with copolyketone polymeric material having an inherent viscosity below 0.75 are deficient since the crystalline copolyketone of such composition tends to crack upon flexing, especially at low temperatures.

It is further necessary and essential that the above copolyketone polymeric material be crystalline. If the copolyketone is permitted to remain in the amorphous state, the laminar structures prepared therewith do not possess the required high dimensional stability properties that are characteristic of the crystalline copolyketone polymeric material. The copolyketone may be crystallized either before or after the composite structure is made, and the latter is preferred since lower laminating pressures are required. For the copolyketone polymers of interest here, amorphous copolymers have a density of approximately 1.26 to 1.27 g./cc., and highly crystalline copolymers have a density of approximately 1.31 g./cc. The copolyketone layer of the laminar structures of the present invention should have a density of not less than 1.29 g./cc.

The copolyketone layer of the laminar structure of the invention is crystallized by annealing, i.e., subjecting the structure to a heat treatment which induces crystallization of of the copolymer. A variety of conditions may be used for this purpose, and the optimum conditions for any given copolyketone copolymer will depend on its T:I ratio. For higher T:I ratios within the range under consideration here, the optimum crystallization temperature is higher. Operable temperatures are generally in the range of 200°-350°C., so long as the temperature chosen is above the temperature of inception of crystallization and below the melting point. For example, for a copolyketone copolymer having a T:I ratio of 70:30, maximum crystallinity is achieved at about 275°C., while for a copolymer having a T:I ratio of 50:50, maximum crystallinity is achieved at about 225°C. The copolyketone copolymer can be held at the crystallization temperature for a matter of minutes (1-30 mins.) if it is desired to develop near to the maximum possible crystallinity, but sufficient crystallinity for good dimensional stability has been developed in copolyketone copolymers having a T:I ratio of 70:30 in continuous runs with rolls of film by contacting the film for less than 5 seconds with a drum heated at 275°C.

A salient feature of the present invention resides in the manner whereby the copolyketone layer and the metal foil layer are united to provide a unitary structure of laminar construction without employing any adhesive agents between said layers. In accordance with the method of the invention, the metal layer is contacted with a film structure of the copolyketone described hereinabove. This is preferably accomplished by melt-extruding the copolyketone film directly onto the metal foil layer. The extrusion temperature will vary depending upon the T:I ratio of the copolyketone, and also with its molecular weight (or melt viscosity). Extrusion temperatures from about 10°C. to about 50°C. above the melting point of the copolyketone are satisfactory. Extrusion temperatures towards the lower end of the above range are preferred in order to minimize degradation of the copolyketone, and extrusion temperatures below 400°C. are pre-ferred for this reason. The extrusion temperature will generally fall within the range of about 300°C. to about 400°C. The optimum extrusion temperature will vary depending upon the T:I ratio of the copolyketone, and for the range of T:I ratios under consideration, the extrusion temperature will be higher as the T:I ratio increases or becomes greater. For example, when the T:I ratio is 70:30, a preferred extrusion temperature is between about 360°C. and about 370°C.; and when the T:I ratio is 50:50, a preferred extrusion temperature is between about 330°C. and about 350°C. Following extrusion of the polymer onto the metal foil, the coated metal is advanced through a nip under moderate pressure in order to bring the materials into firmer contact thereby to more firmly bond them together. Pressures of 40-50 psi. or greater are satisfactory for this purpose.

In addition to the foregoing melt-extruding technique, the laminar structure of the invention may be made by pressure laminating the copolyketone film to the metal foil. This operation is ordinarily carried out at moderate temperature and pressure, and can be done either with individual sheets of the material, or continuously with rolls of the two materials. Suitable laminates have been made by bonding at temperatures of 300°C. under pressures as low as 45 psi. and as high as 625 psi., with dwell times ranging between about 10 seconds and about 2 minutes. Shorter dwell times of a second or less have been found suitable in continuous roll lamination. Pressures of 1000 psi. and higher are also operable.

The metal layer utilized for preparing the laminar structure of the invention should be clean with its surface free of dust and dirt. For example, copper foil is best prepared for use by suitably oxidizing the surface thereof which is to be bonded to the copolyketone film. Such oxidized surfaces can be prepared with a variety of oxidizing reagents such as persulfates, chromates, etc.

The laminar structures of the present invention may be fabricated into printed circuits by procedures and techniques well known in the art. To illustrate, printed circuits of copper can be made from a laminar structure of the invention consisting of a layer of copper foil bonded to a layer of a copolyketone polymeric material of formula (1) above. Briefly, the areas of the copper pattern to be retained are covered with a resist which is waterproof, leakproof, and not attacked by an etchant; suitable resists are usually a wax, resin, ink, pressure sensitive mask, or like material. The areas of bare copper are removed with an etchant which attacks the copper, such as aqueous solutions of ferric chloride, cupric chloride, ammonium persulfate, or other suitable reagent. The time required will depend on numerous factors such as thickness of the copper foil to be removed, concentration and temperature of etchant solution, amount of agitation, etc., and may range from a fraction of a minute to hours. After etching is complete, the material is washed free of etchant, and the resist is removed by appropriate means, e.g., pressure sensitive masks are simply striped off, and waxes, resins and inks are removed by washing with a solvent suitable for the specific material used. The printed circuit materials of this invention possess numerous advantages over printed circuit materials of the prior art.

The layers of the printed circuit exhibit excellent adhesion without the use of any adhesive or primer layer. Peel strengths of 8 to 11.7 pounds per inch are typical. These peel strengths were attained by laminating at 300°C. under pressures ranging from 625 pounds per square inch to 45 pounds per square inch and dwell times of 10 to 120 seconds. After aging at 200°C. for 3 hours, the bond strengths were largely unaffected, being in the range of 7.9 to 11.7 pounds per inch. That this is achieved with no adhesive is of advantage since most adhesives degrade under the influence of heat or oxygen, lose their effectiveness at high humidity, and incur a cost penalty in their use. The bond of the printed circuit material has excellent hydrolytic stability; after 14 days in boiling water, bond strength was still greater than 50 per cent of the initial value.

The printed circuits have high dimensional stability, even at the temperature of molten solder baths used in soldering printed circuits. Shrinkage for 15 seconds exposure at 300°C. in such a bath is approximately 0.5 per cent in both machine and transverse directions of the structure. Furthermore, there is no tendency to delaminate or blister in solder baths at 300°C. Samples of the printed circuit material conditioned at 50 percent relative humidity at room temrerature for 24 hours exhibit essentially no shrinkage in either machine or transverse direction when heated to 125°C. for 48 hours.

The printed circuits have very low moisture absorption. This is of great importance since moisture absorption has deleterious effects on both electrical properties and intralaminar adhesion. Moisture absorption of the polymer layer of copolyketone employed herein is unusually low, and is lower than that of common polyesters and polyimides. Moisture absorption of the copolyketone, after immersion in distilled water for 24 hours, is about 0.2 per cent by weight, while that of polyethylene terephthalate (a polymer used in many printed circuits) is about 0.8 per cent.

The polymer of the printed circuit structures is unaffected by the ferric chloride etching solution used in preparation of circuits with this material. The printed circuits have little tendency to stress-crack in contact with various solvents and solutions. Flammability tests rank the copolyketone of the printed circuit material as somewhat more flame resistant than common polyesters and aromatic polyamides. In a thermal shock test wherein a printed circuit specimen of copolyketone and copper is subjected to five cycles consisting of 30 minutes at −65°C. and 30 minutes at 90°C., the printed circuit did not crack, embrittle, delaminate or blister.

The printed circuit devices above described are adapted to be connected to any suitable utilization circuit by means and methods well known in the art.

The particular advantages of the novel laminar structure of the present invention and printed circuits made therefrom include the following: it has a high degree of dimensional stability, even when subjected to temperatures conventionally employed in soldering operations; the copolyketone has excellent electrical insulating properties; the copolyketone is strongly adherent directly to the metal layer without the use of any adhesive; moisture absorption from the atmosphere by the copolyketone is low (absorption of moisture by a polymer tends to reduce both adhesive and insulating properties); the copolyketone has very little tendency to stress-crack, and is unaffected by chemical solutions usually used in printed circuit manufacturing operations, such as metal etchants used for producing circuit patterns.

The principle and practice of the present invention will now be illustrated by the following Examples which are only exemplary thereof and it is not intended that the invention be limited thereto since modifications in technique and operation will be apparent to anyone skilled in the art.

The test samples of laminar structures of polyketone and metal prepared in the following Examples were evaluated in accordance with the following testing procedure for peel strength:

PEEL STRENGTH is measured by lifting or separating the polyketone layer from the metal layer of a test specimen of the polyketone/metal laminar structure that is one inch wide and at least two inches long. The polyketone layer is gently lifted or separated for a short distance from the metal layer at one end, and the separated polyketone is clamped to the jaws of an Instron test device while the exposed metal layer is in similar fashion clamped to another set of jaws of the test device. The test specimen is then pulled apart on the test device at a rate of 12 inches per minute and the force required to peel the polyketone layer from the metal layer is recorded.

EXAMPLE 1

A copolyketone having a T:I ratio of 70:30 was prepared by charging 123.06 g. (0.606 mol) of terephthaloyl chloride, 52.74 g. (0.260 mol) of isophthaloyl chloride and 1040 ml. of distilled hydrogen fluoride into an autoclave interior surface plated with gold) of 2 liter capacity. The vessel was closed and cooled to 0°C., and 377 g. of boron trifluoride was charged into the vessel under 150 psi. Then 148.70 g. (0.874 mol) of diphenyl ether was melted and injected into the vessel. While stirring at 200 rpm., the vessel was heated to 35°C. for 1 hour. The resulting deep red-purple solution was poured into aqueous ammonia, and the precipitated polymer was collected by filtration. The copolyketone polymer was washed in a blendor (high shear stirrer) with N,N-dimethylacetamide, then four times with water, and finally three times with methanol, and then it was dried under vacuum (low pressure nitrogen atmosphere) at 50°C. for 2 days. The copolyketone polymer had an inherent viscosity of 1.10, measured as a 0.5 percent by weight solution in concentrated sulfuric acid at 23°C.

Part of the above copolyketone polymer, 74 g., was combined with parts of the products of eight similar polymerization runs; the amounts and inherent viscosities of the other samples were as follows:

| Run | Amount | Inherent Viscosity |
|---|---|---|
| B | 4 g. | 1.05 |
| C | 2 | 1.00 |
| D | 9 | 1.04 |
| E | 8 | 1.03 |
| F | 100 | 1.05 |
| G | 197 | 0.88 |
| H | 11 | 0.84 |
| I | 4 | 1.17 |

For purposes of purifying it, the 409 g. of combined copolyketone was stirred with 5441 g. (3480 ml.) of dichloroacetic acid for 4 days. The solution was a dark cherry red color. Then 20 ml. of triethylsilane was added as four 5-ml. portions at five minute intervals; with each addition the color became lighter, finally an orange-brown. After 1 hour, an additional 5 ml. of triethylsilane was added and stirring continued for 30 minutes, the final color was orange. The polymer solution was poured slowly into distilled water and ice in a blendor. The precipitated white polymer was collected and soaked in 2.5 gal. of N,N—dimethylacetamide for 12 days. The polymer was again collected then washed three times in N,N—dimethylacetamide, three times in distilled water and three times in methanol. The polymer was dried under vacuum (low nitrogen pressure) at 50°C. for 2 days and at 200°C. for 2 days. The polymer had an inherent viscosity of 1.06, measured on a 0.5 percent by weight solution in concentrated sulfuric acid at 23°C.

The copolyketone resin was extruded into film form with a short-barrel 3/4-in. extruder having a chromium plated screw and stainless steel barrel and die. The resin feed temperature was 117°C., barrel temperatures were 370° to 396°C., and the die temperature 372° to 385°C. The screw was run at 40 rpm., and the pressure ranged from 600 to 1300 psi. Polymer throughput was 5 to 6 grams per minute. There was obtained 70 ft. of film having a thickness ranging from about 2 to about 4 mils and 100 ft. of film having a thickness ranging from about 4 to 10 mils. The inherent viscosity of the extruded copolyketone film structure ranged from 1.08 to 1.11, measured as a 0.5 percent by weight solution in concentrated sulfuric acid at 23°C. The film structure had a density of 1.269 g./cc., and X-ray data showed it to be amorphous, with a crystallinity index of 0. Calorimetry indicated a glass transition temperature of 165°C., crystallization at 219°C., and crystalline melting point of 335°–340°C. Other film properties are shown in Table I, Table II (tensile properties) and in Table III (electrical properties) below. The film was less than 1 percent soluble in "Arochlor" (thought to be mixed chlorinated biphenyls) at temperatures up to 150°C.

A piece of the above copolyketone film (4 mils thick) was laminated to a 3-mil sheet of copper foil in a press at 300°C. under approximately 200 lbs. per sq. in. for 2 minutes. The copper foil had been treated before lamination to oxidize one surface; the oxidized surface was the side laminated to the copolyketone film.

A strip of the above laminate was immersed in a 300°C. solder bath for 10 sec. The laminate specimen did not blister, delaminate or warp.

A printed circuit was prepared from another portion of the above laminate as follows. A series of parallel lines were drawn on the copper face of the specimen with "Marks-A-Lot" ink (a waterproof, leakproof ink supplied by Carter's Ink Co.); the dried ink served as the resist. The specimen was immersed in 2.5 molar aqueous ferric chloride solution at 45° to 50°C. for about 30 minutes in order to remove the areas of bare copper. The specimen was rinsed with water. The ink resist was then removed by washing with acetone.

The printed circuit was immersed in a 300°C. solder bath for 10 sec. The specimen did not blister or delaminate. and it retained its flexibility.

Another specimen of the above printed circuit was placed in an air oven at 125°C. for 48 hours. At the end of this time there was no evidence of blistering, delamination or shrinkage.

TABLE I

| | |
|---|---|
| Permeability $H_2O$ | 210 g/hr—100 m² (for 1 mil film) |
| Impact Str. (Kg-cm/mil) | 2.1 |
| MIT Fold | 12,300 |
| Tear Str. (g/4.29 cm-mil) | 30–60 |

TABLE II

Tensile Properties
Film Thickness (mils) 2.5

| Temp. (°C.) | Modulus (Kpsi) | Elongation (%) | Tensile Strength (Kpsi) |
|---|---|---|---|
| 23 | 303 | 125 | 12.3 |
| 50 | 339 | 152 | 10.0 |
| 105 | 273 | 186 | 8.0 |
| 130 | 248 | 273 | 7.2 |
| 155 | 192 | 652 | 7.8 |
| 167 | 9.1 | 655 | 7.7 |
| 180 | 1.4 | 520 | 5.8 |
| 200 | 6.0 | 403 | 6.1 |
| 250 | 9.1 | 590 | 6.1 |

TABLE III

Electrical Properties
Film Thickness (mils) 4–5

| Temp. (°C.) | Volume Resistivity (OHM-CM) | K ($10^2/10^5$ Hz) | Dissipation Factor ($10^2/10^5$ Hz) |
|---|---|---|---|
| 23 | $8 \times 10^{16}$ | 4.2/4.1 | 0.004/0.005 |
| 50 | $5 \times 10^{16}$ | 4.2/4.1 | 0.004/0.006 |
| 105 | $4 \times 10^{15}$ | 4.1/4.0 | 0.002/0.004 |
| 130 | $7 \times 10^{14}$ | 4.1/4.0 | 0.002/0.004 |
| 155 | $1 \times 10^{14}$ | 3.9/3.8 | 0.002/0.004 |
| 167 | $2 \times 10^{13}$ | 4.1/3.8 | 0.005/0.008 |
| 180 | $5 \times 10^{12}$ | 5.3/3.9 | 0.04/0.04 |
| 200 | $5 \times 10^{11}$ | 4.8/4.2 | 0.05/0.04 |
| 250 | $1 \times 10^{10}$ | 6.7/4.6 | 1.15/0.02 |

EXAMPLE 2

A copolyketone of formula (1) having a T:I ratio of 70:30 was prepared from diphenyl ether, terephthaloyl chloride and isophthaloyl chloride in ortho-dichlorobenzene with aluminum chloride catalyst. After isolating and purifying the resulting copolyketone resin, it had an inherent viscosity of 0.82 (0.5 percent by weight in concentrated sulfuric acid at 23°C.).

The above copolyketone resin was extruded into film with a 3/4 in. extruder and 4 in. die. The screw, barrel and die were chromium plated, and the breaker plate made of Hastelloy C. A filter pack of 50-, 100-, 150- and 250-mesh nickel wire screen was employed. Film was extruded with a barrel temperature range of 360–370°C., a die temperature of 370°–372°C., and a screw speed of 50 rpm., at pressures of 200 to 450 psi. There was obtained 55 ft. of film 1 to 3 mils thick and 25 ft. of film 5 to 8 mils thick. The film was tough, flexible and glossy. The inherent viscosity of the extruded film was 0.87. This ascast extruded film was amorphous, as shown by X-ray examination.

A sample of the above film was laminated to the oxidized side of a 3-mil copper foil having one oxidized surface, in a press at 300°C. under approximately 200 lbs. per sq. in. for 2 minutes.

A printed circuit was prepared from a 2 in. × 2 in. portion of the above copolyketone/copper laminate by the method described in Example 1. The printed circuit was weighed, immersed in water for 24 hours, and weighed again. The moisture absorption of the specimen was 0.2 percent.

Another 2 in. × 2 in. circuit specimen, prepared in the same way, was subjected to a thermal shock test. In this test, the specimen is subjected to five thermal cycles, each cycle being 30 minutes at −65°C. (specimen placed in glass vessel, which is in turn placed in an acetone/solid carbon dioxide bath) and 30 minutes at 90°C. (air oven). The specimen showed no evidence of blistering, warping or shrinkage; nor of measling or measled effect.

EXAMPLE 3

Another copolyketone like that of Example 2 was prepared in the same way. It had an inherent viscosity of 0.67. It was extruded into film with the same apparatus; the barrel temperature was 373°–375°C., the die temperature 373°C., the screw speed 50 rpm., and the barrel pressure 300 to 400 psi. The inherent viscosity of the film was 0.66. The film was clear, flexible, and 5 to 10 mils thick.

Specimens of the above as-cast extruded film were clamped to frames and heat treated at 275°C. for 30 minutes. The film was annealed, crystallized and heat-set by this treatment. In order to determine the flammability of this film as compared to other available materials, determination of the limited oxygen index was carried out. The limited oxygen index is defined as the minimum mole fraction (or volume fraction) of oxygen in an atmosphere which will sustain combustion of the specimen. In this test, the specimen (in this case a stiff strip of film) is supported form its lower end within a vertical glass tube having a 3-inch inside diameter; a series of test specimens is used while varying the mole fraction of oxygen in an oxygen/nitrogen mixture, until that gas composition is found which will just sustain burning of the material; the oxygen/nitrogen stream flows up the column at a linear velocity of 4 to 9 cm./sec. (flow rate of 11,000 to 25,000 cc./min.); the top of the specimen is ignited with a microburner; to be judged flammable in a given atmosphere, the specimen should burn its entire length; higher numbers indicate a greater degree of inflammability; a material having an LOI (limited oxygen index) of 0.27 or greater is termed self-extinguishing. In this test, the above crystallized copolyketone film was found to have an LOI of 0.35. In the same test, polyethylene terephthalate film had an LOI of 0.22, and an aromatic polyamide an LOI of 0.285.

Another sample of the above as-cast extruded film was laminated to copper foil as described in Example 2. A measured sample of the laminate was exposed to a temperature of 260°C. for 30 seconds, and measured again; there was no shrinkage. A sample of the laminate immersed in 10% aqueous hydrochloric acid for 5 seconds showed no visible change.

EXAMPLE 4

Another copolyketone like that of Example 2 was prepared in the same way. It had an inherent viscosity of 0.80. It was extruded into film with the same apparatus; the barrel temperature was 370°–375°C., the die temperature 373°C., the screw speed 50 rpm., and the barrel pressure 600 to 800 psi. The film was tough and flexible, was 1 to 3 mils thick, and had an inherent viscosity of 0.90.

A sample of the above as-cast extruded film was clamped to a frame and heated at 275°C. for 2 minutes in order to crystallize the film. Another sample was similarly treated at 325°C. for 2 minutes for the same purpose. Both heat-treated samples had a density of 1.303 g./cc., which is indicative of high crystallinity. In order to assess the dimensional stability of the crystalline film during exposure to the conditions of a molten solder bath, six film specimens of various sizes were floated on the surface of a molten solder bath at 300°C. for 10 seconds, and the specimens measured before and after this treatment with a cathetometer. The average shrinkage of the film in the machine direction was 0.64 percent, and in the transverse direction 0.42 percent.

Another sample of the above as-cast extruded film clamped to a frame and heated at 275°C. for 30 minutes to crystallize it; the density of the crystallized film was 1.304 g./cc. The film was tested for its water absorption in accordance with ASTM-D-570-63. Three specimens of the film, of various sizes, were washed in petroleum ether for 20 minutes, allowed to dry in air for 2 hours, then dried at 50°C. for 24 hours, cooled in a dessicator and weighed. The specimens were then immersed in distilled water at 23 ± 1°C. for 24 hours. The specimens were removed from the water, all surface water removed with a dry cloth, and they were immediately reweighed. The moisture absorption of the specimens was zero, 0.2 percent and 0.28 percent; the average moisture absorption was 0.16 percent.

Three specimens of the above film which was crystallized by heat treating at 275°C. for 30 min., all having reference marks between 1.3 and 1.8 cm. in the machine direction and 2.7 and 3.1 cm. in the transverse direction, were measured with a cathetometer to the nearest hundredth of a centimeter, heated at 250°F. for 2 hours, and again measured. None of the specimens showed any shrinkage in either the machine or transverse direction.

Additional samples (1 in. × 3 in.; 1.4 to 2.6 mils thick) of the above as-cast extruded film were laminated to two copper foils (one on each side of the copolyketone film, with the oxidized surface of the copper foil in contact with the polyketone in every case) at 300°C., using various pressures and dwell times, as summarized in Table IV below. The peel strengths of the polyketone/copper bonds were measured and are also given in Table IV. Additional such samples were prepared and aged at 200°C. for 3 hours before measuring bond strength; the results are also given in Table IV below. Yet other such specimens were prepared and placed in boiling distilled water for 14 days before measuring bond strength; the results are also included in Table IV. All peel strengths were measured at a peel rate of 12 in./min.

TABLE IV

| Lamination pressure (psi.) | Lamination dwell time (min.) | Peel as prepared | Strengths (lbs./in.) Aged at 200° C. | Aged in boiling water |
| --- | --- | --- | --- | --- |
| 625 | 2 | 11.6 | 11.7 | 10.4 |
| 625 | 1 | 11.6 | 10.1 | 7.7 |
| 200 | 2 | 11.7 | 10.0 | 9.3 |
| 200 | 1 | 10.9 | 9.0 | 6.2 |
| 45 | 2 | 8.0 | 7.9 | 6.4 |
| 45 | 1 | 9.0 | 9.1 | 6.5 |

EXAMPLE 5

Another copolyketone like that of Example 2 was prepared in the same way. It was extruded into film with the same apparatus; the barrel temperature was 358°–367°C., the die temperature 359°–367°C., the screw speed 50 rpm., and the barrel pressure 800 to 1000 psi. The film contacted a quench roll at about 150°C. a short distance from the die lips. The film was tough and flexible, had high gloss, was 1 to 3 mils thick, and had inherent viscosities in the range 0.72 to 0.81. The film density was 1.271 g./cc.

Samples of the above 1-mil film were laminated to the oxidized side of 3-mil copper foil having one oxidized surface, in a press at 300°C. under a pressure of at least 45 psi. for 4 minutes.

A specimen of the copolyketone/copper laminate was placed into 2.5 molar aqueous ferric chloride solution at 45° to 50°C. for about an hour to effect complete removal of the copper layer by etching. The remaining copolyketone film was thoroughly washed in water, and dried in an oven at 85°C. for 3 hours. The film density was 1.310 g./cc., which is indicative of a high level of crystallinity. It is therefore evident that a high level of crystallinity was induced in the film during the press lamination step.

Another specimen of the copolyketone/copper laminate, approximately 2 in. × 2 in. and conditioned at 50 percent relative humidity at room temperature for 24 hours, was marked with reference marks and measured with a cathetometer. The specimen was immersed in a molten solder bath at 292°C. for 10 seconds. The specimen showed no warping, blistering or measling. Measurement indicated no shrinkage in either machine or transverse directions.

Another specimen of the copolyketone/copper laminate, conditioned at 50 percent relative humidity at room temperature for 48 hours., was marked with reference marks and measured. It was heated in air at 125°C. for 48 hours. The specimen showed no warping, measling or delamination. Measurement indicated no shrinkage in either machine or transverse directions.

Specimens of the copolyketone/copper laminate were subjected to the thermal shock test described in Example 2. They showed no evidence of warping, blistering, measling or delamination.

Another specimen of the copolyketone/copper laminate was subjected to the ASTM water absorption test described in Example 4. The specimen showed zero water absorption.

EXAMPLE 6

Another copolyketone like that of Example 2 was prepared in the same way. It had an inherent viscosity of 0.89. It was extruded into film with the same apparatus; the barrel temperature was 367°–372°C., the die temperature 348°C., the screw speed 50 rpm., and the barrel pressure 700 to 1000 psi. The film was tough, flexible, glossy, 0.7 to 2 mils thick, and had an inherent viscosity of 0.99.

Samples of the above film were laminated to the oxidized side of 3-mil copper foil having one oxidized surface, in a press at 300°C. under a pressure of at least 45 psi. for a time of at least 1 minute. Printed circuits were prepared from the laminates by the method described in Example 1.

One of the printed circuits was conditioned at 50 percent relative humidity at room temperature for 24 hours, marked with reference points, measured with a cathetometer, then aged in air at 125°C. for 48 hours. After aging, the sample showed no blistering, measling or delamination. Measurement indicated no shrinkage.

Another of the printed circuits (polyketone film thickness 1.7 mils) was marked with reference points, measured with a cathetometer, heated to 275°C. for 60 seconds, and again measured. There was 0.66 percent shrinkage in the machine direction, and no shrinkage in the transverse direction. The specimen showed no embrittlement, cracking or delamination.

Yet another of the printed circuits (polyketone film thickness 1.5 mils) was immersed in a solder bath at 300°C. for 30 seconds. There was no embrittlement, blistering, measling or delamination.

EXAMPLE 7

Another copolyketone of formula (1) having a T:I ratio of 70:30 was prepared and extruded into film in a manner similar to that described in Example 2. The film was tough, flexible, and had an inherent viscosity of 0.92. A sample of this film was laminated to the oxidized surface of a 3-mil copper foil having one oxidized surface, in a press at 300°C. under about 200 psi. for 2 minutes. A piece of this laminate was placed in 2.5 molar aqueous ferric chloride solution at 45° to 50°C. for about an hour to effect complete removal of the copper by etching. The remaining copolyketone film was thoroughly washed with water, and dried in an air oven at 90°C. overnight. The film was not brittle, but completely flexible.

A similar procedure was followed with a similar copolyketone film of the same composition, but which had an inherent viscosity of 0.67. The film recovered was brittle.

It is therefore concluded that it is highly desirable to use copolyketone having an inherent viscosity of at least about 0.75 in making the printed circuit material of this invention. Polymer having lower inherent viscosity and which is crystalline (Example 5 demonstrates that the polymer crystallizes under the lamination conditions used) tends to be brittle.

EXAMPLE 8

Another copolyketone like that of Example 2, prepared in the same way and having an inherent viscosity of 0.76, was extruded in a continuous process directly onto the oxidized side of a 2.8-mil copper foil having one oxidized surface. In the extrusion coating operation, the same apparatus as in Example 2 was used; the barrel temperature was 360°–365°C., the die temperature 350°C., the screw speed 50 rpm., and the barrel pressure 800 to 1200 psi. Immediately following extrusion of the copolyketone onto the copper foil, the combination was pressed against a quench drum by a nip roll. The copolyketone layer of the laminate was varied in thickness from 1 to 5 mils, mostly about 1 mil. The inherent viscosity of the polymer layer was 0.75, and its density was 1.273 g./cc.; the low density indicated that the copolyketone was amorphous.

Specimens (1.5 in. × 3 in.) of the above laminate were immersed in a molten solder bath at 275°C. for varied lengths of time. After removing the specimen from the solder bath, the layers of the laminate were peeled apart, and the polymer layer was placed in concentrated hydrochloric acid for 45 seconds to remove any traces of solder. The film was washed in running water for one minute, and was dried. The film density was then determined. The results for samples immersed in the solder bath for various lengths of time are given in Table V below; also included in the table are two controls, Control A is a film not immersed in the solder bath, but merely stripped form the copper; Control B is a film not immersed in the solder bath, stripped from the copper, washed in hydrochloric acid and water, and dried. It is evident that as little as 2 seconds at 275°C. is sufficient to induce considerable crystallinity in the film, and that a high degree of crystallinity is achieved in 10 seconds at 275°C.

Additional specimens of the above laminate were subjected to a temperature of 300°C. for brief periods in a solder bath. The intralaminar bond of the specimens so treated was so good that the copolyketone and copper layers could not be peeled apart.

TABLE V

| Immersion Time In Solder Bath (sec.) | Density (g./cc.) |
| --- | --- |
| 0 (Control A) | 1.273 |
| 0 (Control B) | 1.279 |
| 2 | 1.293 |
| 5 | 1.299 |
| 10 | 1.311 |
| 20 | 1.307 |
| 30 | 1.309 |
| 40 | 1.311 |
| 60 | 1.310 |

EXAMPLE 9

A roll of amorphous film of copolyketone (1) having a T:I ratio of 70:30, similar to that of Example 2, was laminated to the oxidized side of a roll copper foil having one oxidized surface in a continuous nip lamination operation with a heated drum at 250°C. A good smooth bond between the two layers was obtained.

The resulting laminate was passed through the same apparatus a second time, using a drum temperature of 275°C. In this pass, haziness or cloudiness which was produced in the polymer layer indicated crystallization of that layer.

EXAMPLE 10

A copolyketone resin (1) having a T:I ratio of 50:50 was prepared from diphenyl ether, terephthaloyl chloride and isophthaloyl chloride in ortho-dichlorobenzene with aluminum chloride catalyst. After isolation and purification it had an inherent viscosity of 0.81 (0.5 percent by weight solution in concentrated sulfuric acid at 23°C.). This copolyketone resin was extruded into film with a 3/4-inch extruder having a chromium plated barrel, screw and die. The main barrel temperature was 340°–347°C., the die lips 320°–326°C., the barrel pressure ranged from 500 to 1200 psi., and the screw speed 50 rpm. The film was tough and flexible. It was 0.7 to 12 mils thick and had an inherent viscosity of 0.85. The film density was 1.2728 g./cc.

Samples of the above film were laminated to the oxidized side of 3-mil copper foil having one oxidized surface, in a press at 250°C. under approximately 200 psi. for 2 minutes.

A strip of the above laminate was immersed in a molten solder bath at 270°C. for 10 seconds; the specimen did not blister, delaminate or warp. Another strip was immersed in a molten solder bath at 300°C. for 10 seconds; this specimen did not blister or delaminate, and showed only slight warping.

Printed circuits were prepared from another portion of the above laminate by the method described in Example 1. The printed circuit was immersed in a molten solder bath at 275°C. for 10 seconds. The specimen remained flexible, and did not blister or delaminate.

Another specimen of the printed circuit was placed in an air oven at 125°C. for 48 hours. At the end of this time there was no evidence of blistering, delamination or shrinkage.

EXAMPLE 11

A printed circuit was prepared from a laminate of copper and a copolyketone (1) having a T:I ratio of 70:30. The laminate was similar to that prepared in Example 2, and the printed circuit was prepared as in Example 1 except that the etchant was 2.75 molar aqueous ferric chloride. A hole was pierced in each of two lanes of the remaining copper pattern, the two leads of a carbon-element resistor were inserted into the two holes, and the leads were soldered to the copper lanes with a soldering gun. No delamination of copper form copolyketone occurred during soldering. The resistance between the two lanes of copper was measured and found to be exactly the same as that measured between the two leads of the resistor.

EXAMPLE 12

Example 11 was repeated, except that the resist used in preparation of the printed circuit was narrow strips of polyethylene terephthalate tape coated on one side with pressure sensitive adhesive. After etching, the pressure sensitive tapes were simply stripped off by hand. A resistor was affixed to the printed circuit as described in Example 11, and the same results as described in Example 11 were obtained.

The inherent viscosity of the copolyketone described herein was obtained by measuring a 0.5 per cent by weight solution of the polymer in concentrated sulfuric acid at 23°C. To calculate inherent viscosity, the viscosity of the polymer solution is measured relative to that of the acid alone. The calculation of inherent viscosity is made in accordance with the following formula:

$$\text{Inherent viscosity} = \frac{\text{Natural logarithm} \frac{\text{Viscosity of solution}}{\text{Viscosity of acid solvent}}}{C}$$

where C is the concentration expressed in grams of polymer per 100 milliliters of solution.

What is claimed is:

1. A laminar structure comprising at least one layer of a metal bonded to at least one layer of a crystalline copolyketone having the following repeating structural unit:

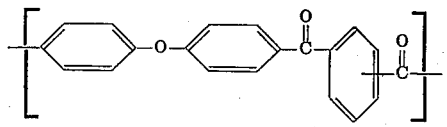

wherein the

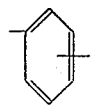

moiety is either

(T) or

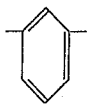

(I), and the T:I ratio varies from 90:10 to 50:50, the copolyketone having an inherent viscosity of at least 0.75, as measured as a 0.5 percent solution, by weight, in concentrated sulfuric acid at 23°C.

2. The laminar structure of claim 1 wherein the layer of metal is of a thickness between about 0.5 mil and about 20 mils.

3. The laminar structure of claim 2 wherein the copolyketone layer is of a thickness between about 0.5 mil and about 20 mils.

4. The laminar structure of claim 3 wherein said metal layer is copper.

5. A laminar structure comprising a layer of a crystalline copolyketone having the following repeating structural unit:

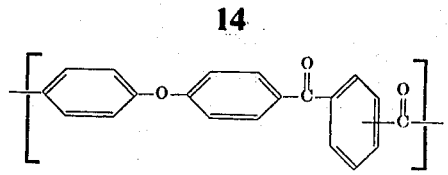

wherein the

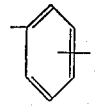

moiety is either

(T) or

(I), and the T:I ratio varies from 90:10 to 50:50, the copolyketone having an inherent viscosity of at least 0.75, as measured as a 0.5 percent solution, by weight, in concentrated sulfuric acid at 23°C., and a layer of metal bonded to each surface thereof.

6. The laminar structure of claim 5 wherein each layer of metal and said copolyketone layer are each of a thickness between about 0.5 mil and about 20 mil.

7. The laminar structure of claim 6 wherein each of the metal layers is copper.

8. A printed circuit device adapted for connection to a utilization circuit comprising at least one layer of a non-conductive crystalline copolyketone film structure having the following repeating structural unit:

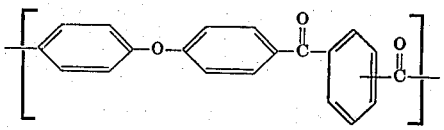

wherein the

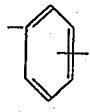

moiety is either

(T) or

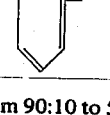

(I), and the T:I ratio varies from 90:10 to 50:50, the copolyketone having an inherent viscosity of at least 0.75, as measured as a 0.5 percent solution, by weight, in concentrated sulfuric acid at 23°C., and electrically conductive means disposed on at least one surface of said copolyketone layer.

9. The printed circuit device of claim 8 wherein electrically conductive means are disposed on each surface of said copolyketone layer.

10. The printed circuit device of claim 9 wherein said electrically conductive means are disposed in conductive electrical association on opposite surfaces of said copolyketone layer.

11. The printed circuit device of claim 8 wherein said copolyketone layer is of a thickness between about 0.5 mil and about 20 mils.

12. The printed circuit device of claim 11 wherein said electrically conductive means is copper.

13. A process for preparing laminar structures which comprises contacting at least one surface of a layer of metal with a film structure of a copolyketone having the following repeating unit:

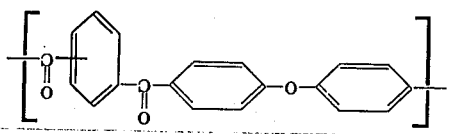

wherein the

moiety is either

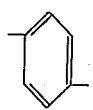

(T) or

(I), and the T:I ratio varies from 90:10 to 50:50, the copolyketone having an inherent viscosity of at least 0.75, as measured as a 0.5 percent solution, by weight, in concentrated sulfuric acid at 23°C., at a temperature between about 300°C. and about 400°C. and a pressure of at least about 40 psi thereby firmly to bond together said metal and said copolyketone film.

14. The process of claim 13 wherein said contacting is performed by melt-extruding said copolyketone directly onto said layer of metal.

15. The process of claim 14 further characterized by advancing the composite structure of said copolyketone and said metal through a pressure nip adapted to press said copolyketone film to said layer of metal at a pressure between about 40 psi and about 50 psi.

16. The process of claim 15 wherein said layer of metal and said copolyketone film are bonded in a press at a pressure up to about 625 psi.

* * * * *